United States Patent
Stauffer et al.

(10) Patent No.: US 12,365,160 B2
(45) Date of Patent: Jul. 22, 2025

(54) CONNECTOR ASSEMBLY

(71) Applicant: NANOLEQ AG, Rümlang (CH)

(72) Inventors: Flurin Stauffer, Zurich (CH); Luca Hirt, Olten (CH); Vincent Martinez, Zurich (CH); Heike Bördgen, Zurich (CH); Nikolaus Ganter, Winterthur (CH)

(73) Assignee: NANOLEQ AG, Rümlang (CH)

( * ) Notice: Subject to any disclaimer, the term of this patent is extended or adjusted under 35 U.S.C. 154(b) by 263 days.

(21) Appl. No.: 17/928,525

(22) PCT Filed: Jun. 14, 2021

(86) PCT No.: PCT/EP2021/065944
§ 371 (c)(1),
(2) Date: Nov. 29, 2022

(87) PCT Pub. No.: WO2022/002569
PCT Pub. Date: Jan. 6, 2022

(65) Prior Publication Data
US 2023/0147172 A1    May 11, 2023

(30) Foreign Application Priority Data
Jul. 1, 2020  (EP) .................................. 20183433

(51) Int. Cl.
*B32B 5/02*     (2006.01)
*B32B 3/26*     (2006.01)
(Continued)

(52) U.S. Cl.
CPC ................ *B32B 5/02* (2013.01); *B32B 3/266* (2013.01); *B32B 5/26* (2013.01); *B32B 7/12* (2013.01);
(Continued)

(58) Field of Classification Search
CPC .. B32B 5/02; B32B 3/266; B32B 5/26; B32B 7/12; B32B 37/06; B32B 2305/38; B32B 2307/202; B32B 2437/00; B32B 2457/08; B32B 2250/44; B32B 2260/021; B32B 2260/046; B32B 2262/0246; B32B 2262/0261; B32B 2262/0276;
(Continued)

(56) References Cited

U.S. PATENT DOCUMENTS

2010/0234715 A1   9/2010   Shin et al.
2019/0316008 A1   10/2019  Choi et al.
(Continued)

FOREIGN PATENT DOCUMENTS

DE   102015007157        12/2016
DE   102015007157 A1  *  12/2016
(Continued)

OTHER PUBLICATIONS ip.com translation of DE-102015007157-A1 (Year: 2024).*
(Continued)

*Primary Examiner* — Michael Zhang
(74) *Attorney, Agent, or Firm* — Branch Partners PLLC; Bruce E. Black

(57) ABSTRACT

The invention relates to a connector assembly, a seam tape, a garment and a method to produce a connector assembly.

21 Claims, 17 Drawing Sheets

(51) Int. Cl.
  *B32B 5/26* (2006.01)
  *B32B 7/12* (2006.01)
  *B32B 37/06* (2006.01)
  *H01B 5/16* (2006.01)
  *H01B 13/00* (2006.01)

(52) U.S. Cl.
  CPC .............. *B32B 37/06* (2013.01); *H01B 5/16* (2013.01); *H01B 13/0036* (2013.01); *B32B 2305/38* (2013.01); *B32B 2307/202* (2013.01); *B32B 2437/00* (2013.01); *B32B 2457/08* (2013.01)

(58) Field of Classification Search
  CPC .......... B32B 2262/103; B32B 2307/51; B32B 2307/732; B32B 2535/00; B32B 2555/00; B32B 2556/00; B32B 3/08; B32B 5/022; B32B 5/024; B32B 5/026; B32B 5/028; B32B 5/04; B32B 7/05; B32B 25/10; B32B 27/12; B32B 27/308; B32B 27/34; B32B 27/36; B32B 3/06; H01B 5/16; H01B 13/0036
  See application file for complete search history.

(56) References Cited

U.S. PATENT DOCUMENTS

2020/0105440 A1\* 4/2020 Mahajan, Jr. ........ H01B 7/0225
2020/0157713 A1   5/2020 Nakajima et al.
2020/0291273 A1\* 9/2020 Kwon ...................... H01B 1/24
2022/0392664 A1\* 12/2022 Hirt ...................... H01B 7/0225

FOREIGN PATENT DOCUMENTS

| EP | 3822328 A1 | 5/2021 | |
| JP | 3195050 U | 12/2014 | |
| JP | 2019-220247 A | 12/2019 | |
| JP | 2020072049 A \* | 5/2020 | ............... H01Q 1/38 |

OTHER PUBLICATIONS

Extended European Search Report for EP Patent Application No. 20183433.0 mailed Nov. 25, 2020.
International Search Report and Written Opinion for PCT Application No. PCT/EP2021/065944 mailed Sep. 7, 2021.

\* cited by examiner

CONNECTOR ASSEMBLY

CROSS-REFERENCE TO RELATED APPLICATIONS

This present application is a U.S. national stage application of PCT Application No. PCT/EP2021/065944, filed Jun. 14, 2021, which claims priority to European Patent Application No. 20183433.0, filed Jul. 1, 2020, both of which are hereby incorporated by reference in their entirety.

The invention relates to a connector assembly, a seam tape, a garment and a method to produce a connector assembly.

DE 10 2015 007 157 A1 relates to a flat electrical contact assembly, for example for a textile heating element. The assembly has a sandwich structure with at least one conductive thermoplastic textile. The conductive textile is connected to an electrical conductor, e.g., a flat strand, a highly conductive tape or a metal foil.

It is an object of the invention to provide a mechanically, chemically and electrically robust connector assembly, e.g., for connecting components of e-textiles. Further objects of the invention are to provide a connector assembly adapted to establish an electrical connection that can survive mechanical deformations such as stretching and bending and/or chemical influences such as sweat and washing. A further object may be seen in providing a robust connector assembly that may be produced in a thermo bonding process.

These and further objects of the invention are solved by the subject-matter of the independent claims. Further embodiments of the invention are set out in the dependent claims, the description and the drawings.

In the context of the invention, the terms "up", "down", "above", "below", etc. refer to a direction perpendicular to the layers of the connector assembly with the base material being the lowest layer and the cover fabric being the uppermost layer. Thus, the down-up direction is directed from the base material towards the cover fabric.

In the context of the invention, the term "conductive" refers to electrical conductivity, unless specified otherwise. In other words, "conductive" refers to a materials property to conduct electric current. Preferably, the electrical resistivities of the conductive materials mentioned herein are below $10^{-3}$ $\Omega$m.

The invention relates to a connector assembly comprising a base material, a first conductive fabric bonded to the base material, an elastic and compressible electrical conductor electrically connected to the first conductive fabric, and a textile cover fabric bonded to the first conductive fabric such that a portion of the electrical conductor is located between the first conductive fabric and the textile cover fabric. A portion of the electrical conductor is at least partly in a compressed state.

The connector assembly may be adapted to electrically connect components, e.g., of an e-fabric to an electrical conductor. The e-fabric may be part of a garment such as a sports suit, an electro muscle stimulation suit (EMS suit), or a garment with means to electronically measure biological signals such as muscle activity, heart activity or breathing, or a garment with means to electronically measure environmental parameters which may be safety relevant, such as temperature, radiation levels, pressure. More specifically, the connector assembly may be adapted to connect a conductor, e.g., a conductor embedded in a stretchable seam tape, to electrical components such as body electrodes. In other words, the first conductive fabric, to which the electrical conductor is electrically connected, forms a tongue that connects to the electrical component.

Preferably, the first conductive fabric is electrically connected to an electrical component. Preferably, the electrical component includes one or more elements of the group consisting of a body electrode, a sensor, a heating element, a lighting device, a processing unit, a printed circuit board, an electrical connector, a wire, and a button.

The connection that can be established with the connector assembly of the present invention can survive mechanical deformations such as stretching and/or bending and/or chemical influences such as sweat and washing.

The base material may be a textile fabric, elastomer, a printed circuit board (PCB). For example, the base material may be part of a garment.

Preferably, the first conductive fabric comprises a knitted, woven, non-woven or a metal mesh textile. The conductive fabric may comprise non-conductive elements such as polyamide, nylon, acrylic, polyester, elastane and/or conductive elements such as stainless steel, silver, nickel, copper, copper alloys, tin, zinc, cobalt, manganese, iron, gold, carbon and combinations thereof.

Preferably, the first conductive fabric comprises a silver-coated textile mesh.

Preferably, the first conductive fabric is stretchable. More preferably, a force of 20 N causes an elongation of the first conductive fabric of at least 20%.

Preferably, the first conductive fabric is elastic. More preferably, the first conductive fabric is stretchable and elastic.

Preferably, the first conductive fabric has a sheet resistance below 5 $\Omega$/sq ("ohms per square").

Preferably, the electrical conductor is an elongated electrical conductor. In the context of the present invention, the term "elongated" refers to the dimensions of the electrical conductor rather than to its state (stretched versus unstretched) and is supposed to cover any conductor whose length is greater (preferably by at least a factor of 2, more preferably at least a factor of 10) than its diameter.

The electrical conductor is elastic. In this way, the electrical conductor may be stretchable. Preferably, a tension of 0.2 N causes an elongation of the electrical conductor of at least 10%. More preferably, a tension of 0.6 N causes an elongation of the electrical conductor of at least 50%.

The resistance of the conductor is preferably between 0.1 $\Omega$/m and 100 $\Omega$/m at rest.

In the context of the present invention, the term "elastic" refers to a material property of the electrical conductor and requires that the electrical conductor can be elastically stretched, at least along the direction of elongation of the electrical conductor, by manually achievable forces and relaxes back into its unstretched state if the forces are no longer applied. Preferably, the elastic material of the electrical conductor has a Young's modulus between 10 kPa and 1 GPa, more preferably between 100 kPa and 100 MPa, most preferably between 100 kPa and 2 MPa. This applies equally to other "elastic" components described herein.

Furthermore, the electrical conductor is compressible. The term "compressible" implies that the conductor may assume a relaxed state and a compressed state and that the size, e.g. diameter or height, of the conductor differs in the compressed state and the relaxed state. Preferably, the electrical conductor is compressible at least in a direction perpendicular to a direction of the electrical conductor's elongation. The compressibility of the electrical conductor may be due to its elasticity. Preferably, a force of 5 N causes at least a local reduction of the size of the conductor of 15% along the direction of the force.

A portion of the electrical conductor is at least partly in a compressed state. Preferably, the portion of the electrical conductor located between the first conductive fabric and the cover fabric is at least partly in a compressed state. However, it is also envisaged that only a part of said portion is in a compressed state. Thus, the electrical conductor is compressed at least along one direction, preferably a direction perpendicular to a plane defined by the first conductive fabric, cover fabric and/or base material when the connector assembly is lying flat. The term "compressed state" implies that a diameter or height of the portion of the electrical conductor at least along said direction is smaller than the diameter or height of the portion of the electrical conductor in a relaxed state. Thus, the diameter or height of the conductor may be measured along a pressing direction of a bonding process.

This may, e.g., be measured by comparing a first diameter or height of the portion of the electrical conductor located between the first conductive fabric and the cover fabric with a second diameter or height of another portion of the electrical conductor located outside the first conductive fabric and the cover fabric. For example, the connector assembly may be cut through at a portion including the first fabric, the cover fabric and the compressed portion of the electrical conductor to measure the first diameter or height of the electrical conductor. Furthermore, the electrical conductor may be cut through in an area where it is not bonded to the first conductive fabric to measure the second diameter or height of the electrical conductor. By comparing said first diameter or height and said second diameter or height, it may be established that the portion of the electrical conductor is in a compressed state.

Alternatively, a first diameter or height may be measured after cutting through the connector assembly at a portion including the first fabric, the cover fabric and the compressed portion of the electrical conductor. Subsequently, the connector assembly may be disassembled, e.g., by melting the adhesive, e.g., by hot air. After disassembly, the electrical conductor reassumes a relaxed state due to its elasticity, such that a second diameter or height may be measured. By comparing said first diameter or height and said second diameter or height, it may be established that the portion of the electrical conductor is in a compressed state.

By providing the electrical conductor in a compressed state in the connector assembly, the electrical conductor presses against the conductive fabric. In this way, a good and robust electrical connection may be ensured, in particular during flexing and/or stretching as well as after repeated flexing and/or stretching. In other words, the electrical conductor is in electrical and mechanical contact with the conductive fabric.

The textile cover fabric is bonded to the first conductive fabric. The term "bonding" may refer to an action of joining or laminating components by means of adhesive, heat, pressure, and/or ultrasound. The term "bonding" may include ultrasound welding. By defining that a first component (e.g., the first conductive fabric) is "bonded" to a second component (e.g., the base material), it follows that there is a joint between the first component and the second component which is established by bonding. For this purpose, an adhesive layer may be located between the first conductive fabric and the base material and a further adhesive layer may be located between the first conductive layer and the cover fabric. Bonding of the first conductive fabric and the base material may be performed by hot pressing the first conductive layer and the base material. In this way, the respective adhesive layer is at least partially melted such that the layers adjacent to said adhesive layer are bonded together. Thus, the first conductive fabric may be bonded to the base material by means of the adhesive layer located between the first conductive fabric and the base material. The first conductive fabric may be bonded to the cover fabric by means of the adhesive layer located between the first conductive fabric and the cover material. This applies equally to the bonding of other components disclosed herein, e.g., the first conductive layer and the cover layer.

The adhesive layers disclosed herein preferably comprise elastic polymers such as thermoplastic low-melting-temperature polyurethane. Preferably, the adhesive layers have a melting point between 80° C. and 110° C.

A portion of the electrical conductor is located between the first conductive fabric and the cover fabric. In this way, when hot pressing the first conductive fabric and the cover fabric, the portion of the electrical conductor is compressed and pressed to the first conductive fabric. In this way, a robust electrical and mechanical connection of the electrical conductor to the first conductive fabric may be established. Furthermore, after bonding, the portion of the electrical conductor remains in a compressed state after bonding. The portion of the electrical conductor may be maintained in the compressed state by the adhesive that melts around the electrical conductor during bonding.

The bonding of the first conductive fabric to the base material and the bonding of the first conductive fabric to the cover fabric may be performed at the same time by hot pressing the assembly including the base material, the first conductive fabric, the portion of the electrical conductor and the cover fabric.

Bonding is preferably performed by hot pressing the assembly for at least 20 s at a temperature of at least 130° C.

Preferably, the connector assembly is flexible.

The term "flexible" implies that a load applied to respective material, e.g., the connector assembly, causes a bending of the material, e.g., the connection assembly. The term "flexible" further implies that in a three-point flexural test as defined in ASTM D790, the material neither yields nor breaks before the 5% strain limit as defined in ASTM D790.

Preferably, the flexural modulus of the connector assembly is below 2.5 GPa. More preferably, the flexural modulus is below 20 MPa.

Preferably, the connector assembly may be bent more than 90° around a rod with a bending radius of less than 4 mm without breaking/failing.

Preferably, the connector assembly is stretchable.

The term "stretchable" implies that a tension force applied to the respective material, e.g., the connector assembly, causes an elongation of the material, e.g., the connector assembly. Preferably, a force of 20 N causes an elongation of at least 20%. Preferably, the stretchable connector assembly is elastic. For example, a force of 14 N causes an elongation of 20%. This corresponds to a stress of 1.27 MPa and the elastic modulus is around 6.35 MPa. For example, a force of 24 N causes an elongation of 40%. This corresponds to a stress of 2.2 MPa and the elastic modulus is around 5.3 MPa. These values, however, depend on the adhesive and the textile.

Preferably, a height or diameter of the electrical conductor in said portion of the electrical conductor measured perpendicularly to a plane defined by the first conductive fabric is smaller than 95%, preferably 90%, more preferably 80% of the height or diameter of the electrical conductor measured along the same direction in a relaxed state.

Preferably, the connector assembly further comprises a second conductive fabric bonded to the cover fabric and the first conductive fabric. The portion of the electrical conductor is also electrically connected to the second conductive fabric and is sandwiched between the first conductive fabric and the second conductive fabric.

Thus, the cover fabric may be bonded to the first conductive fabric via the second conductive fabric.

Preferably, the second conductive fabric has the same properties as the first conductive fabric.

For bonding the second conductive fabric to the cover fabric, an adhesive layer may be located between the second conductive fabric and the cover fabric. In the assembled connector assembly, i.e. after bonding, the first conductive fabric may be in mechanical and electrical contact with the second conductive fabric. Furthermore, the electrical conductor may be pressed between the first conductive fabric and the second conductive fabric. Thus, the electrical conductor may be in mechanical and electrical contact with the first conductive fabric and the second conductive fabric.

By sandwiching the portion of the electrical conductor between the first conductive fabric and the second conductive fabric, the connection of the electrical conductor to the conductive fabrics is improved and more robust, in particular during flexing and/or stretching as well as after repeated flexing and/or stretching.

Preferably, the electrical conductor comprises an elastic and compressible core and a conductive wire wrapped around the elastic core.

The elastic and compressible core preferably comprises an elongated body of natural rubber. The elastic and compressible core may comprise any element of the group consisting of elastane, polyurethane, silicone rubber, polyisoprene, polyethylene rubber, polyacrylic rubber, and thermoplastic polyurethane, and combinations thereof. The elastic and compressible core preferably has a diameter perpendicular to the direction of the elongation of the elastic and compressible core of 0.5 mm to 1.2 mm.

Preferably, the elastic and compressible core has a round cross section.

The conductive wire may comprise any element of the group consisting of copper, copper alloys, silver, stainless steel, aluminum, nickel, tin, zinc, cobalt, manganese, iron, gold, carbon and combinations thereof. Preferably, the conductive wire is silver-coated copper wire. The conductive wire preferably is a litz wire, e.g., made from 5-30 wires, each having a diameter of 0.02 mm-0.08 mm.

The electrical conductor may comprise multiple conductive wires wrapped around the elastic core.

There may be specific wrapping or winding configurations. Preferably, the electrical conductor comprises two conductive wires wound around the elastic core in opposite winding direction and with at least 5 windings/cm.

By providing an electrical conductor with such a construction, the electrical conductor may have an improved elasticity and compressibility. In this way, also the connection of the electrical conductor to the conductive fabric or fabrics is improved, in particular more robust.

Preferably, the electrical conductor further comprises a non-conductive yarn wrapped around the elastic core.

Preferably, the electrical wire or wires may be wrapped around the non-conductive yarn. Then, this construct may be wrapped around the elastic core.

Preferably, the electrical conductor comprises conductive particles embedded in a matrix.

For example, the electrical conductor may comprise an elastomer as matrix filled with dendritic silver microparticles as conductive particles. Above a certain particle content, the particles touch each other, thereby forming a conductive path in the conductive composite material. The electrical conductor may have a diameter between 0.1 mm and 3 mm, preferably between 0.3 mm and 2 mm. The electrical conductor need, however, not be round but could, for example, also have a flat profile with a thickness between 0.05 mm and 0.5 mm and a width between 0.5 mm and 3 mm. The particles preferably have an average size between 1 µm and 50 µm, more preferably between 10 µm and 30 µm. The particle content of the composite material is preferably between 20 vol. % and 35 vol. %, preferably between 20 vol. % and 30 vol. %. The resistance of the electrical conductor is preferably between 1 Ω/m and 100 Ω/m at rest.

The matrix may comprise one or a combination of the following materials: polyurethane, silicone rubber, polydimethylsiloxane, polyisoprene, styrene butadiene rubber, ethylene propylene diene monomer rubber, polychloroprene rubber, chlorosulfonyl polyethylene rubber, acrylonitrile butadiene rubber, polyacrylic rubber, ethylene acrylic rubber, epichlorohydrin rubber, polyisobutylene rubber, hydrogenated nitrile rubber, fluorocarbon rubber, fluorosilicone rubber, perfluorocarbon rubber, polyurethane, styrenic block copolymers, thermoplastic olefins, elastomeric alloys, thermoplastic copolyester, and/or thermoplastic polyamide.

The conductive particles within the conductor matrix may comprise any electrically conductive material, preferably one or a combination of the following constituents: Ag-coated glass particles, Ag-coated Cu particles, Ag-coated metal particles, Au-coated metal particles, copper microparticles, copper nanoparticles, silver microparticles, silver nanoparticles, nano-wires, metallic microparticles, nanotubes (e.g. carbon nanotubes), flakes (e.g. metallic flakes), graphene, aluminium microparticles, gold microparticles, tin microparticles, copper nanowires, silver nanowires, aluminium nanowires, gold nanowires, tin nanowires, copper flakes, silver flakes, aluminium flakes, gold flakes, tin flakes, carbon particles, graphite particles.

By providing a conductive element with such a construction, the conductive element may have an improved elasticity and compressibility. In this way, also the connection of the electrical conductor to the conductive fabric or fabrics is improved and more robust, in particular during flexing and/or stretching as well as after repeated flexing and/or stretching.

Preferably, the connector assembly further comprises an adhesive layer located at least between the first conductive fabric and the electrical conductor, and, if present, also between the first conductive fabric and the second conductive fabric.

More preferably, said adhesive layer does not cover the full area of the first conductive layer. Even more preferably, said adhesive layer is perforated.

Said adhesive layer preferably covers not more than 90%, more preferably not more than 80%, even more preferably around 75% of the surface of the first conductive layer. In particular, the adhesive layer may not cover the entire portion of the electrical conductor located between the first conductive fabric and the cover fabric or the second conductive fabric.

The perforations of said adhesive layer may be evenly distributed over the adhesive layer. The perforations preferably have a size between 0.1 mm and 3 mm, more preferably between 1 mm and 2 mm. The adhesive layer preferably comprises at least 3, more preferably at least 10 perforations per 16 mm$^2$.

By providing an adhesive layer that does not cover the full area of the first conductive fabric or that is perforated between the first conductive fabric and the electrical conductor, and, if present, also between the first conductive fabric and the second conductive fabric, it may be ensured that the contact area between the electrical conductor and the first conductive fabric and, if present, the second conductive fabric is large enough to provide an improved electrical connection, while ensuring a reliable and robust bond of the first conductive fabric and second conductive fabric. In the bonding process, the mechanical and electrical contact between the electrical conductor and the first conductive fabric and optionally the second conductive fabric may be established before the adhesive is melted to fill the voids between and in the fabric(s). The amount of adhesive material may be selected to ensure a proper bonding between the layers. After bonding, the adhesive of the adhesive layer may solidify and/or extend around the conductor and maintain the compression of the conductor.

Alternatively, no adhesive layer may be located between the first conductive fabric and the second conductive fabric. In this case, during bonding, the adhesive material of the adhesive layer located between the second conductive fabric and the cover fabric may extend or melt through the second conductive fabric and may contact the first conductive fabric. Alternatively or additionally, during bonding, the adhesive material of the layer located between the first conductive fabric and the base material may extend or melt through the first conductive fabric and may contact the second conductive fabric.

Thus, the adhesive material of the respective adhesive layer is used for bonding the second conductive fabric to the first conductive fabric.

In the bonding process, the mechanical and electrical contact between the electrical conductor and the first conductive fabric and the second conductive fabric may be established before the adhesive is melted to fill the voids between and in the fabric(s). The amount of adhesive material in the adhesive layer located between the second conductive fabric and the cover fabric and/or the adhesive layer located between the base material and the first conductive fabric may be selected to ensure a proper bonding between the layers, in particular between the first and second conductive fabric layers. After bonding, the adhesive that extends or melts through the first and/or second conductive fabric may be located around the conductor and maintain the compression of the conductor.

Preferably, the cover fabric is not stretchable. Providing a non-stretchable cover fabric will help to limit strains applied to the connector assembly and thus provides an improved mechanical stability of the connector assembly.

Preferably, the cover fabric is stretchable. More preferably, the cover fabric is at least partly in a stretched state.

Preferably, a portion of the cover fabric that is located above the first conductive fabric and/or the second conductive fabric is at least partly in a stretched state.

The term "stretchable" implies that the cover fabric may be stretched at least along one direction. Thus, the cover fabric has a relaxed state and a stretched state, wherein a length of the cover fabric along said direction is greater in the stretched state than in the relaxed state. Preferably, a force of 20 N causes an elongation of at least 20%, preferably at least 30%.

The cover fabric may be elastic.

Alternatively, the adhesive layer located between the cover fabric and the first or second conductive fabric is elastic. Thus, after bonding, the cover fabric may be elastic.

For example, the portion of the cover fabric may be in a stretched state along an elongation direction of the portion of the electrical conductor that is located between the first conductive fabric and the cover fabric and/or the second conductive fabric. The cover fabric may also be in a stretched state along a further direction or further directions, e.g. along a direction perpendicular to the elongation direction of the portion of the electrical conductor.

Also, the adhesive layer located between the cover fabric and the first or second conductive fabric may be in a stretched state.

The term "stretched state" may imply that the cover fabric has an elongation along a stretching direction that is greater than an elongation of the cover fabric along said direction in the relaxed state. Preferably, in the stretched state, a local elongation of the cover fabric is at least 5% greater than in the relaxed state of the cover fabric.

The elongation of the cover fabric in the stretched state may be determined by measuring the elongation of the cover fabric of the connector assembly in the assembled state. The elongation of the cover fabric in the relaxed state may be determined by disassembling the connector assembly, e.g. by melting the adhesive layers and releasing the bonds, e.g., by applying hot air and measuring the elongation of the cover fabric after relaxation.

By providing the cover fabric in a stretched state, the connection of the electrical conductor to the first and/or second conductive fabric may be further improved and more robust. In particular, the stretched elastic cover fabric may further press the electrical conductor to the first and/or second conductive fabric. In this way, the local compression forces provide for a robust electrical contact, in particular during flexing and/or stretching as well as after repeated flexing and/or stretching.

The invention further relates to an assembly including a seam tape and the connector assembly disclosed herein. The electrical conductor is at least partly embedded in the seam tape. Preferably, the seam tape comprises a textile elastic top layer, a first adhesive layer and a second adhesive layer and the electrical conductor is at least partly sandwiched between the first adhesive layer and the second adhesive layer.

The seam tape may be an elongated elastic seam tape as disclosed in European application 19 20 8544.7.

The adhesive layers may also act as insulation layer(s). Each of the adhesive layers may comprise one or more elements selected from the group consisting of elastic polymers such as thermoplastic polyurethane, silicones, polyethylene, polyolefine, thermoplastic polyamides. Each adhesive layer may have a thickness between 0.025 mm and 1 mm.

Preferably, each adhesive layer has a three-layer structure with a middle layer covered on both sides by an external layer. The middle layer may have a higher melting point than the external layers. The melting point of the middle layer may be above 150° C. The external layers may have a melting point of 80° C. to 110° C.

The middle layer may comprise a material selected from the group consisting of a polymer such as a thermoplastic high-melting-temperature polyurethane, preferably with a melting point above 150° C., silicones, polyethylene, polyolefine, and/or thermoplastic polyamides. The middle layer may have a thickness between 0.025 mm and 1 mm.

The external layer may comprise a thermoplastic low-melting-temperature polyurethane, preferably with a melting point between 80° C. and 110° C. Each external layer may have a thickness between 0.01 mm and 1 mm.

The top layer may comprise an elastic textile such as Lycra-based elastic ribbons, elastic polymers such as silicone or polyurethane. The top layer may have a thickness of 0.1 mm to 1 mm.

The seam tape may have a width from 5 mm to 20 mm, preferably from 8 to 12 mm, more preferably 10 mm.

The invention further relates to a garment including the connector assembly or the assembly including the seam tape and the connector assembly disclosed herein.

Preferably, the garment is a sports suit, an electrical muscle stimulation suit (EMS suit), or a garment with means to electronically measure biological signals such as muscle activity, heart activity or breathing, or a garment with means to electronically measure environmental parameters which may be safety relevant, such as temperature, radiation levels, pressure.

The invention further relates to a method to produce a connector assembly, preferably as disclosed herein. The method comprises the steps of providing a base material, bonding a first conductive fabric to the base material, placing an elastic and compressible electrical conductor on the first conductive fabric, preferably electrically connecting the electrical conductor to the first conductive fabric, and bonding a textile cover fabric to the first conductive fabric such that a portion of the electrical conductor is located between the first conductive fabric and the cover fabric. After bonding, the portion of the electrical conductor is at least partly in a compressed state.

Explanations, specifications and technical effects disclosed with reference to the connector assembly also apply to the method to produce a connector assembly. In particular, material properties of the different layers are disclosed with reference to the connector assembly and apply also to the materials used in the method.

Bonding the first conductive fabric to the base material may be performed before, during or after bonding the cover fabric to the first conductive fabric. Preferably, the steps are performed in the following order: First, the first conductive fabric is placed on the base material and these layers are bonded together. Second, the electrical conductor is placed on the first conductive fabric. Third, the cover fabric is placed on the first conductive fabric and the electrical conductor and is bonded to the first conductive fabric. In this way, the first conductive fabric is bonded to the base material and the electrical conductor is electrically connected to the first conductive fabric. Alternatively, all layers may first be stacked and then be bonded together in only one bonding step.

In the step of bonding the cover fabric to the first conductive fabric, the electrical conductor may be pressed against and thereby electrically connected to the first conductive fabric.

Preferably, in any of the bonding steps disclosed herein, bonding is performed by hot pressing the assembly, more preferably for at least 20 s at a temperature of at least 130° C.

Preferably, any of the bonding steps disclosed herein, in particular the step of bonding the second conductive fabric to the first conductive fabric, preferably includes a cool-down phase after hot-pressing. More preferably, during the cool-down phase, pressure is maintained. In this way, the compression in the connector assembly is maintained as the adhesive solidifies completely and the electrical connector is maintained in the compressed state.

It is understood that the first conductive fabric may be bonded to the base material with an adhesive layer located at least between the first conductive fabric and the base material. The cover fabric may be bonded to the first conductive fabric with an adhesive layer located at least between the first conductive fabric and the cover fabric.

Preferably, before the bonding, the electrical conductor has a height h0 measured along a pressing direction. After the bonding, the electrical conductor has a height h1 measured along the pressing direction. The height h1 is smaller than the height h0, preferably $h1<0.95*h0$, more preferably $h1<0.9*h0$, even more preferably $h1<0.8*h0$.

The pressing direction may be perpendicular to a plane defined by the base material, first conductive fabric, second conductive fabric and/or cover fabric when said layers are lying flat.

Preferably, the method further comprises the steps of bonding a second conductive fabric to the first conductive fabric such that the portion of the electrical conductor is sandwiched between the first conductive fabric and the second conductive fabric and bonding the textile cover fabric to the second conductive fabric such that the textile cover fabric is bonded to the first conductive fabric via the second conductive fabric.

It is understood that the second conductive fabric may be bonded to the cover fabric with an adhesive layer located at least between the second conductive fabric and the cover fabric.

The step of bonding the second conductive fabric to the cover fabric may be performed after bonding the first and second conductive fabric. Preferably, the steps are performed in the following order: First, the first conductive fabric is placed on the base material and these layers are bonded together. Second, the electrical conductor is placed on the first conductive fabric. Third, the second conductive fabric is placed on the first conductive fabric. Fourth, the cover fabric is placed on the second conductive fabric. Fifth, the second conductive fabric and the cover fabric are bonded to the first conductive fabric. Alternatively, all layers may first be stacked and then be bonded together in only one bonding step.

Preferably, the steps of bonding the first conductive fabric and the second conductive fabric are performed by hot pressing at least the first conductive fabric, the portion of the electrical conductor, and the second conductive fabric. More preferably, hot pressing is performed for at least 20 s at a temperature of at least 130° C.

In this way, the electrical conductor is maintained in a state where it presses against the first and second conductive fabrics. This provides for an improved and more robust electrical and mechanical connection of the electrical conductor with the first conductive fabric and/or the second conductive fabric.

Preferably, no adhesive layer is placed between the first conductive fabric and the second conductive fabric before bonding.

Preferably, in the bonding process, the adhesive layer located between the second conductive fabric and the cover fabric melts or extends through the second conductive fabric and may contact the first conductive fabric.

Alternatively or additionally, in the bonding process, the adhesive layer located between the first conductive fabric and the base material melts or extends through the first conductive fabric and may contact the second conductive fabric.

Moreover, the adhesive extending or melting through the first and/or second conductive fabric may extend or melt around a portion of the electrical conductor to maintain the portion of electrical conductor in a compressed state.

This may ensure a proper electrical connection between the electrical conductor and the first and second conductive fabrics.

For this purpose, the bonding of the first and second conductive fabrics may be performed with a minimum temperature during a minimum bonding time. Preferably, the temperature is at least 130° C. and bonding time is at least 20 s. More preferably, the temperature is at least 150° C. and bonding time is at least 30 s.

By omitting the adhesive layer between the first conductive fabric and the second conductive fabric, the amount of adhesive located between the electrical conductor and the first and/or second conductive fabric before bonding may be reduced and the contact area between the electrical conductor and the first and/or second conductive fabric before bonding may be increased. In this way, the electrical connection between the electrical conductor and the conductive fabrics may be improved.

Preferably, the method further comprises the step of placing an adhesive layer between the first conductive fabric and the cover fabric or, when present, the second conductive fabric before bonding. More preferably, the adhesive layer does not cover the full area of the first conductive layer. Even more preferably, the adhesive layer is perforated.

By providing an adhesive layer that does not cover the full area of the first conductive fabric or that is perforated, it may be ensured that the contact area between the electrical conductor and the first conductive fabric and, if present, the second conductive fabric is large enough to provide a an improved electrical connection, while ensuring a reliable and robust bond of the first conductive fabric and second conductive fabric.

Preferred embodiments of the present invention are further elucidated below with reference to the drawings.

FIG. 1 shows an exemplary embodiment of an assembly including a seam tape 116 and a connector assembly 100 in an exploded view. It is noted that the exploded view of FIG. 1 is provided for sake of illustration and does not necessarily represent the actual ordering of the manufacturing steps.

Figure 1:
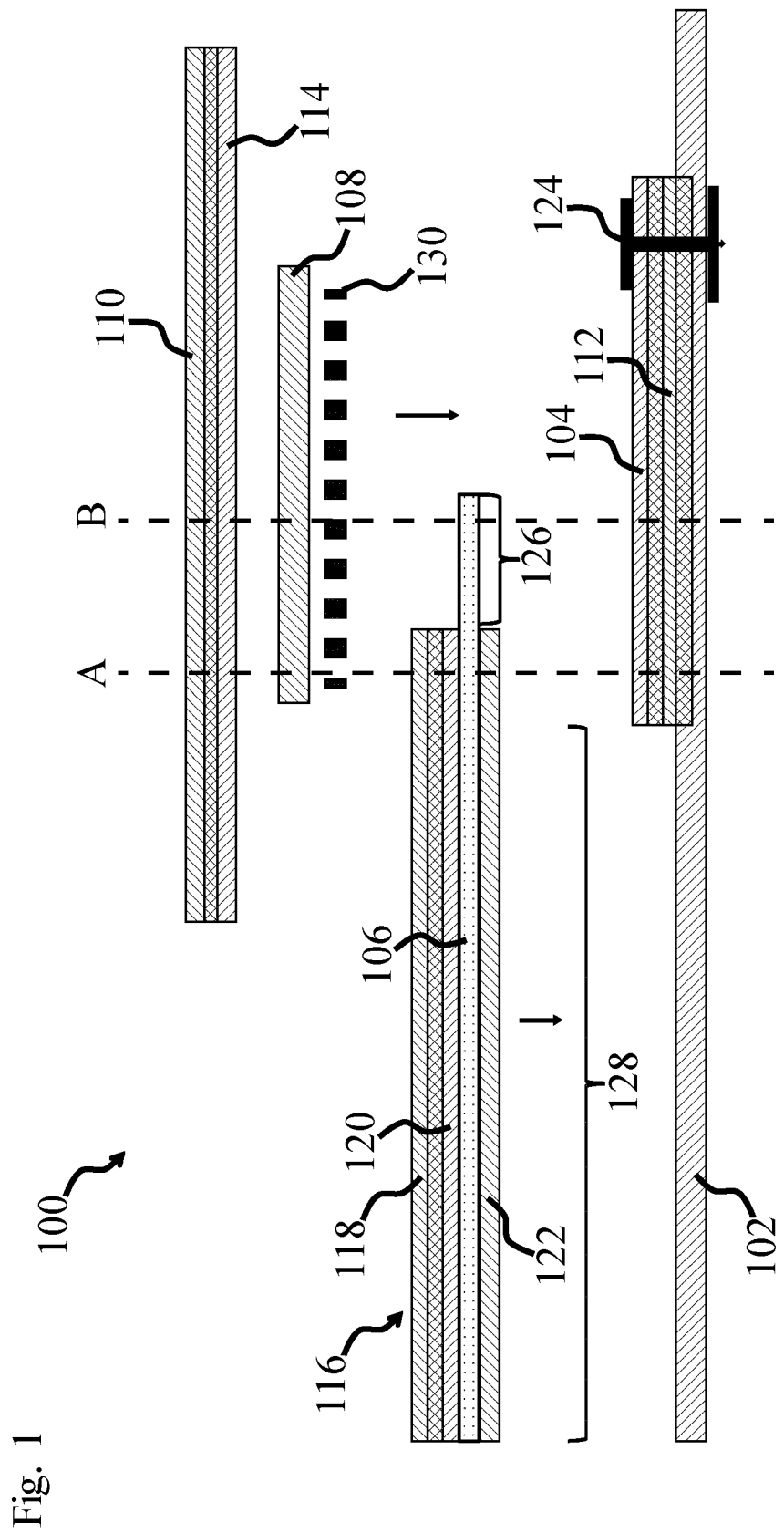
FIG. 1 shows an assembly of a connector assembly and a seam tape according to an exemplary embodiment of the invention in an exploded view.

The assembly includes a base material 102, e.g., a textile base fabric. The connector assembly 100 is provided on the base material 102 and has a layered structure. The layered structure includes a first conductive fabric 104 that is located on top of and bonded to the base material 102 with a first adhesive layer 112 located between the first conductive fabric 104 and the base material 102. The adhesive material of the first adhesive layer 112 may at least partly extend into the first conductive fabric 104.

Furthermore, the connector assembly 100 includes an electrical conductor 106, wherein at least a portion 126 of the electrical conductor is located on top of the first conductive layer 104. The electrical conductor 106 may be at least be partly embedded in a seam tape 116. The seam tape 116 comprises a first adhesive layer 120 and a second adhesive layer 122, between which the electrical conductor 106 is located or sandwiched. Furthermore, the seam tape 116 comprises a textile elastic top layer 118.

The connector assembly 100 further includes a second conductive fabric 108 located on top of the first conductive fabric 104 and at least the portion 126 of the electrical conductor 106. The second conductive fabric 108 is bonded to a textile cover fabric 110 via a second adhesive layer 114. The adhesive material of the second adhesive layer 114 may at least partly extend into the second conductive fabric 108. Furthermore, also a portion of the seam tape 116 may be sandwiched between the first conductive fabric 104 and the second conductive fabric 108.

The first conductive fabric 104 is bonded to the second conductive fabric 108. In this exemplary embodiment, a perforated adhesive layer 130 is placed between the first conductive fabric 104 and the second conductive fabric 108.

In the bonding process, the electrical conductor 106 is compressed at least in the portion 126, such that at least the portion 126 of the electrical conductor 106 is in a compressed state in the assembled connector assembly 100.

Figure 3:
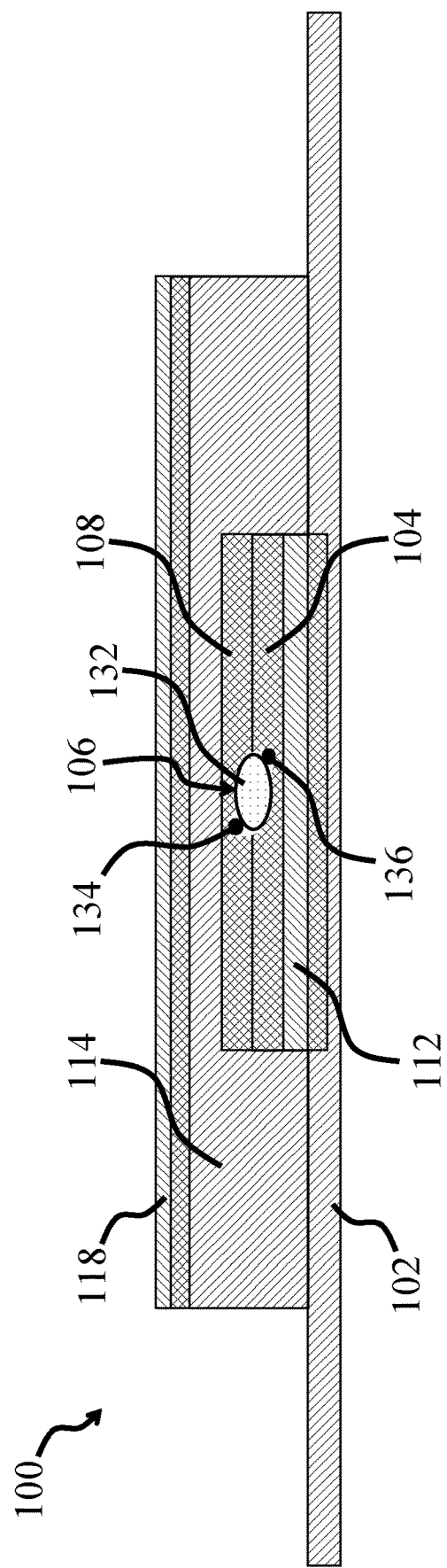
FIG. 3 shows a sectional view of an assembly according to another exemplary embodiment according to the invention.

Although this exemplary embodiment comprises a perforated adhesive layer 130 located between the first conductive fabric 104 and the second conductive fabric 108, said adhesive layer 130 may be omitted, which is, e.g., shown in FIG. 3.

Furthermore, although this exemplary embodiment comprises a first conductive fabric 104 and a second conductive fabric 108, the connector assembly 100 of the invention does not necessarily need to comprise the second conductive fabric 108. I.e. the second conductive fabric 108 may be omitted (not shown). This is exemplarily shown in FIG. 4.

Figure 1A:
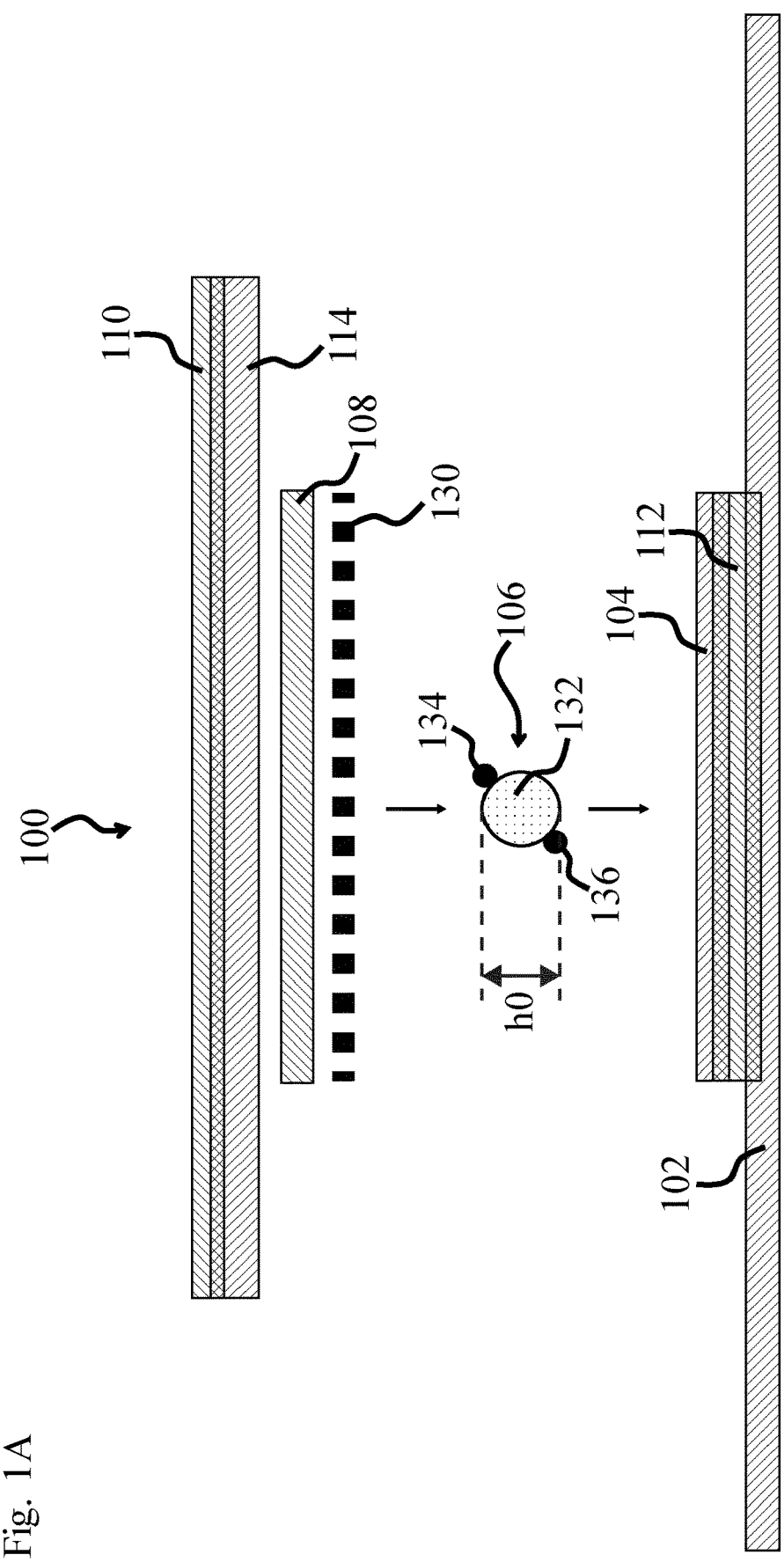
FIG. 1A shows a sectional view along plane B indicated in FIG. 1.

FIG. 1A shows a sectional view along the plane B indicated in FIG. 1. It is shown that the electrical conductor 106 comprises an elastic and compressible core 132 and two conductive wires 134 and 136 wrapped around the compressible core.

Alternatively, the electrical conductor may comprise a base body comprising a matrix material with particles of conductive material embedded within the matrix (not shown).

Figure 1B:
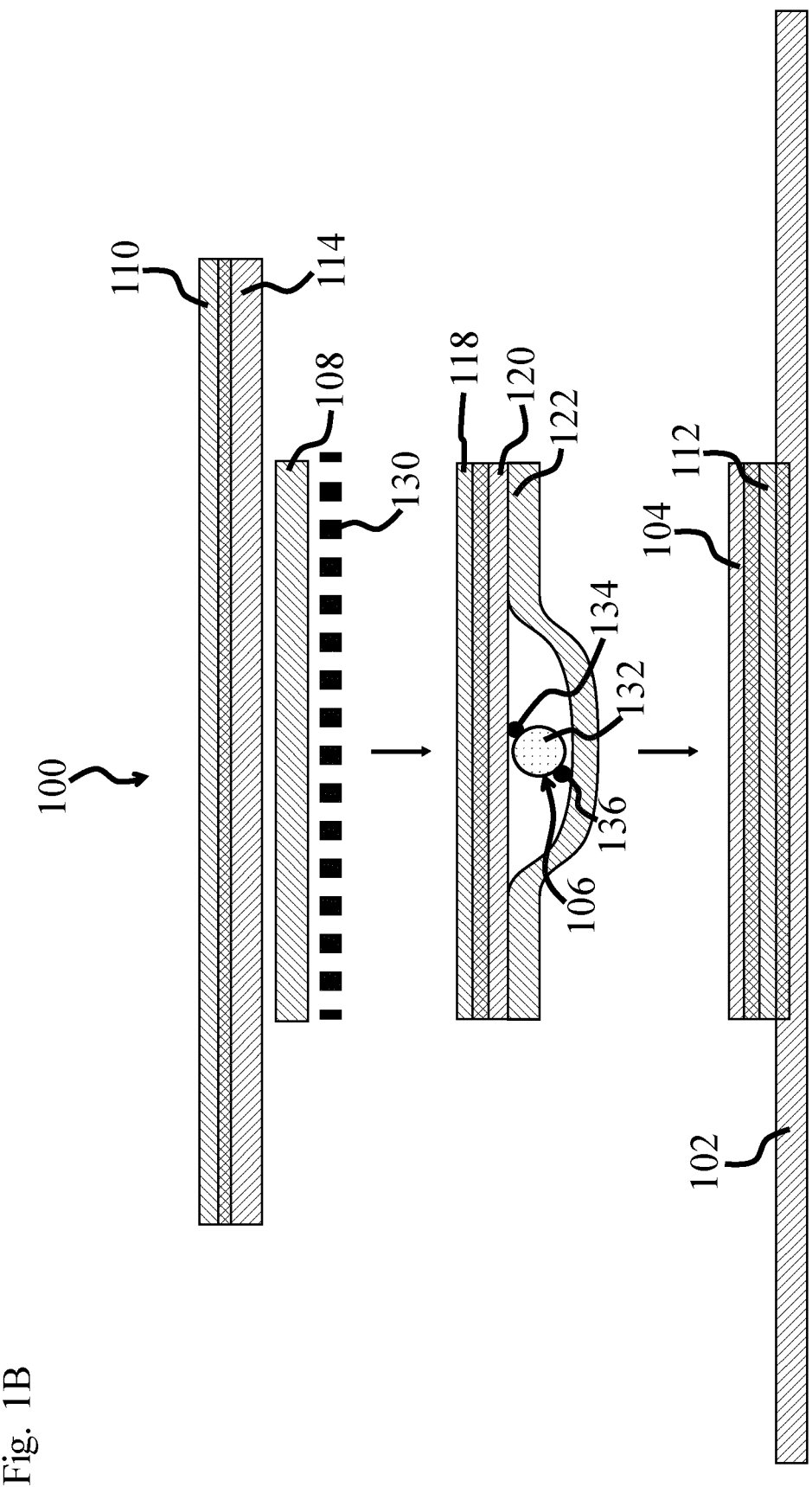
FIG. 1B shows a sectional view along plane A indicated in FIG. 1.

FIG. 1B shows a sectional view along the plane A indicated in FIG. 1.

Figure 2:
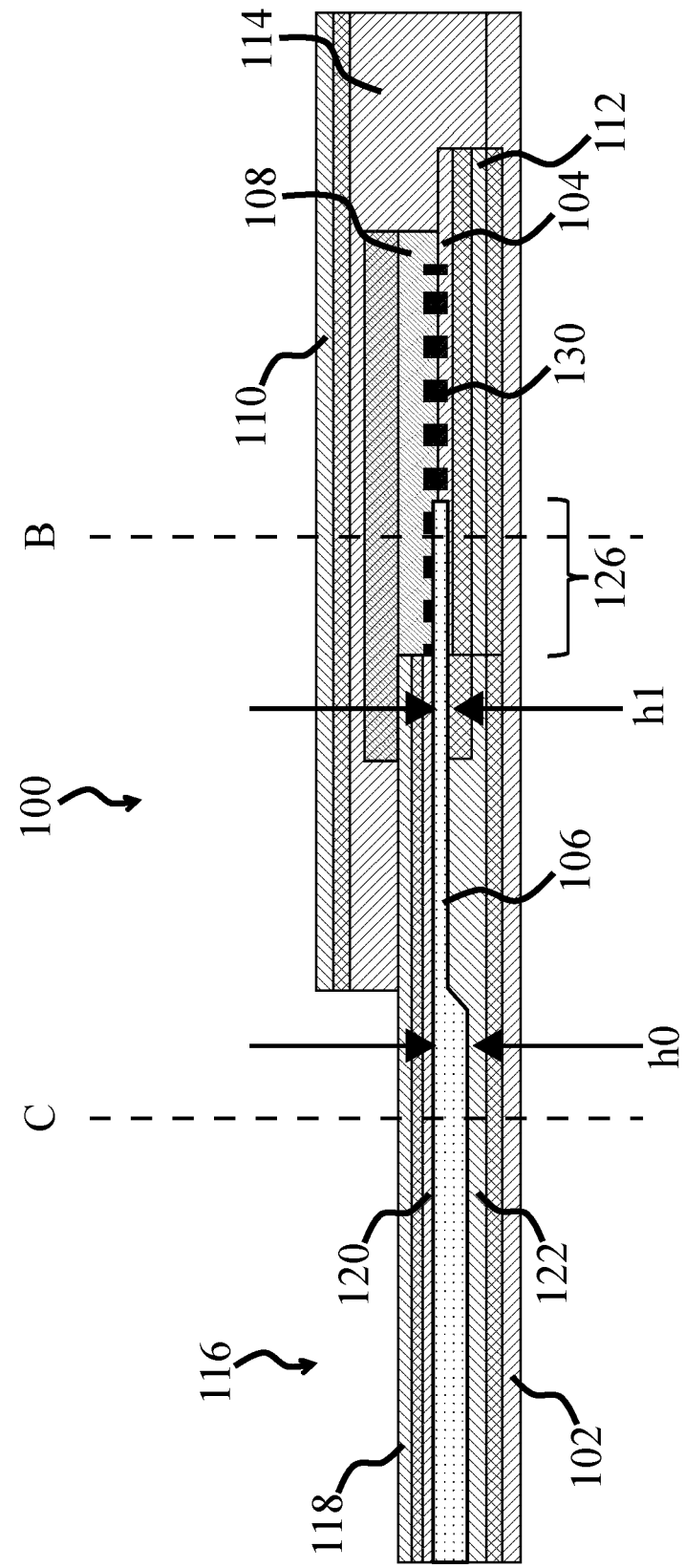
FIG. 2 shows the assembly of FIG. 1 in an assembled state.
Figure 2B:
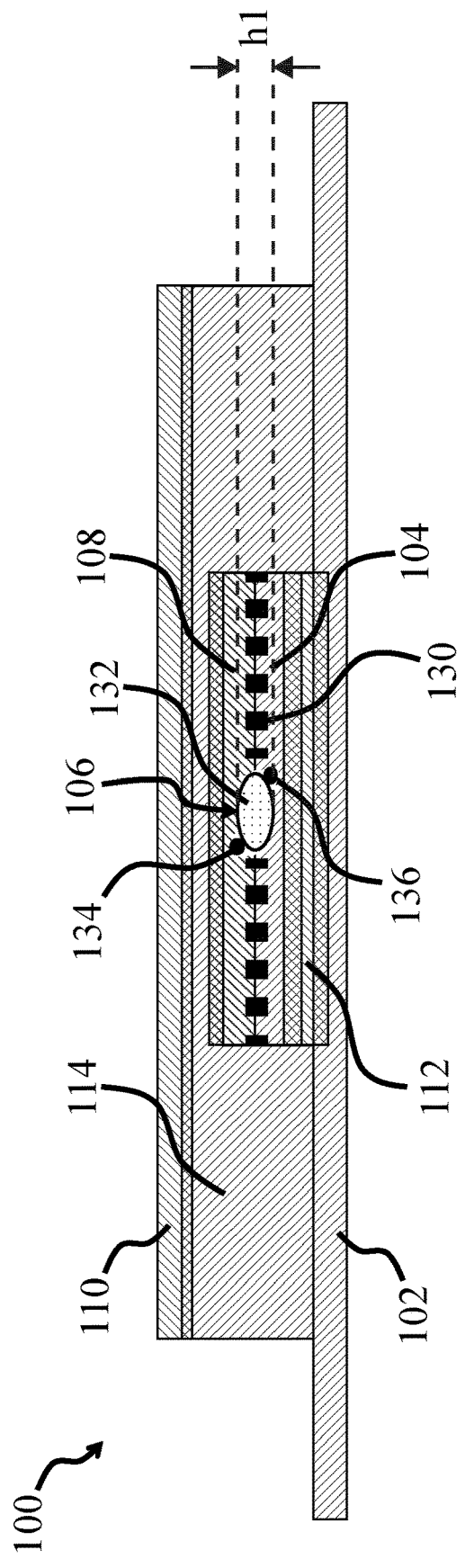
FIG. 2B shows a sectional view along plane B indicated in FIG. 2.
Figure 2C:
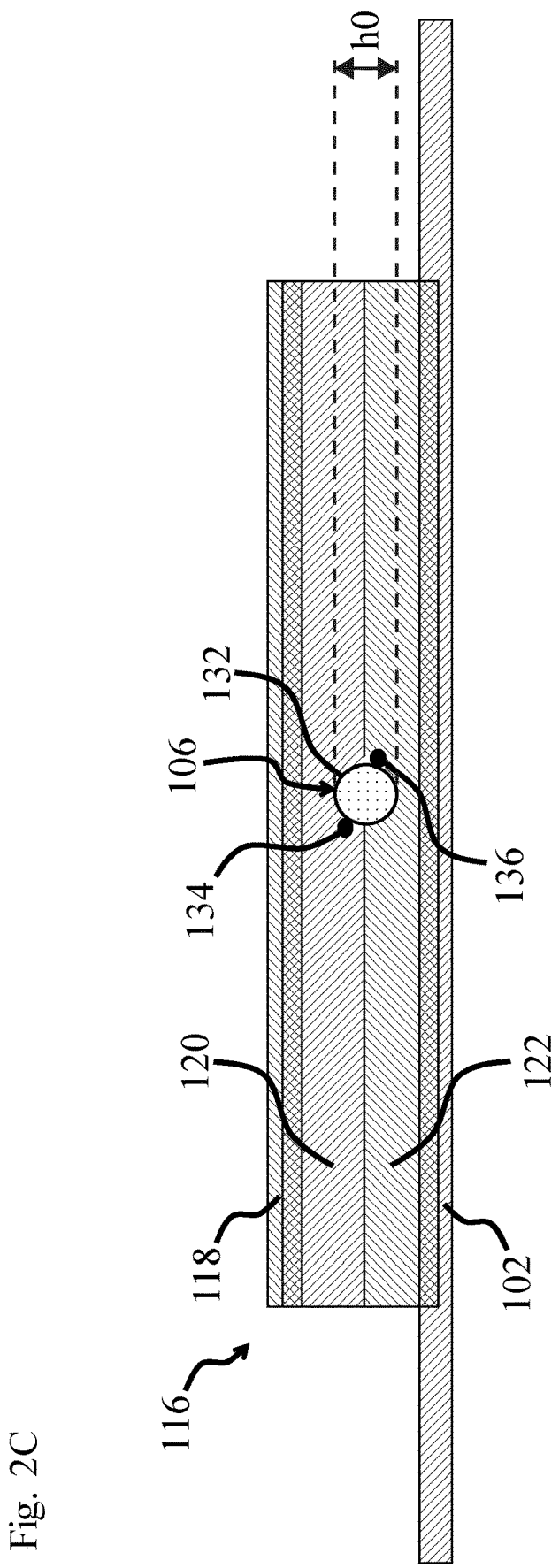
FIG. 2C shows a sectional view along plane C indicated in FIG. 2.

FIG. 2 shows the assembly of FIG. 1 in an assembled and bonded state. FIG. 2B shows a sectional view along plane B indicated in FIG. 2, and FIG. 2C shows a sectional view along plane C indicated in FIG. 2.

That is, the cover fabric 110 and the second conductive fabric 108 are bonded to the first conductive fabric 104 and the base fabric 102.

The first conductive fabric 104 is bonded to the second conductive fabric 108 with the perforated adhesive layer 130. Furthermore, portions of the cover fabric 110 that extend over the first conductive fabric 104 and the second conductive fabric 108 are bonded to the base material 102 and/or the top layer 118 of the seam tape 116 and/or to the first conductive fabric 104 and/or to the second conductive fabric 108.

In this bonded state, at least the portion 126 of the electrical conductor 106 located between the first conductive layer 104 and the second conductive layer 108 is in a compressed state. As can be seen, the portion of the electrical conductor 106 sandwiched between the base material 102 and the cover fabric 110 has a height h1 that is smaller than a height h0 of a portion of the electrical conductor 106 that is not sandwiched by the base material 102 and the cover fabric 110.

This is best shown in FIG. 2B, which shows a sectional view along plane B indicated in FIG. 2. As can be seen, the electrical conductor 106, and in particular the elastic and compressible core 132, is in a compressed state and assumes an oval shape. The electrical conductor 106, in particular the core 132, has a height h1 along a direction perpendicular to a plane defined by the base material 102, the first conductive fabric 104, the second conductive fabric 108 and/or the cover fabric 110. In comparison thereto, FIG. 2C shows a sectional view along plane C indicated in FIG. 2. As can be seen, the electrical conductor is not in a compressed state, i.e. in a relaxed state and assumes a height h0, wherein h1<h0. Similarly, FIG. 1A shows the electrical conductor 106 in a relaxed state where it assumes the height h0. By comparing the height h1 of the electrical conductor 106 in the compressed state (FIG. 2B) with the height h0 in the relaxed state (FIG. 2C, FIG. 1A), it may be established that the electrical conductor 106 is in a compressed state.

Furthermore, also a portion of the electrical conductor 106 located within the seam tape 116 may be in a compressed state. That is, a portion of the seam tape 116 may be located between the first conductive fabric 104 and the second conductive fabric 108. In this portion of the seam tape 116, the electrical conductor 106 may be in a compressed state.

The connector assembly is used to connect the electrical conductor 106 to an electrical component. In the present exemplary embodiment, the electrical component is a snap button 124.

FIG. 3 shows a sectional view along the plane B indicated in FIG. 2 of an assembly according to a further exemplary embodiment.

As can be seen, in this exemplary embodiment, no perforated adhesive layer is located between the first conductive fabric 104 and the second conductive fabric 108. In this exemplary embodiment, adhesive material of the second adhesive layer 114 extends or melts through the second conductive fabric 108 and the first conductive fabric 104.

Apart from that, the assembly has the same structure as the assembly shown in FIG. 1.

Figure 4:
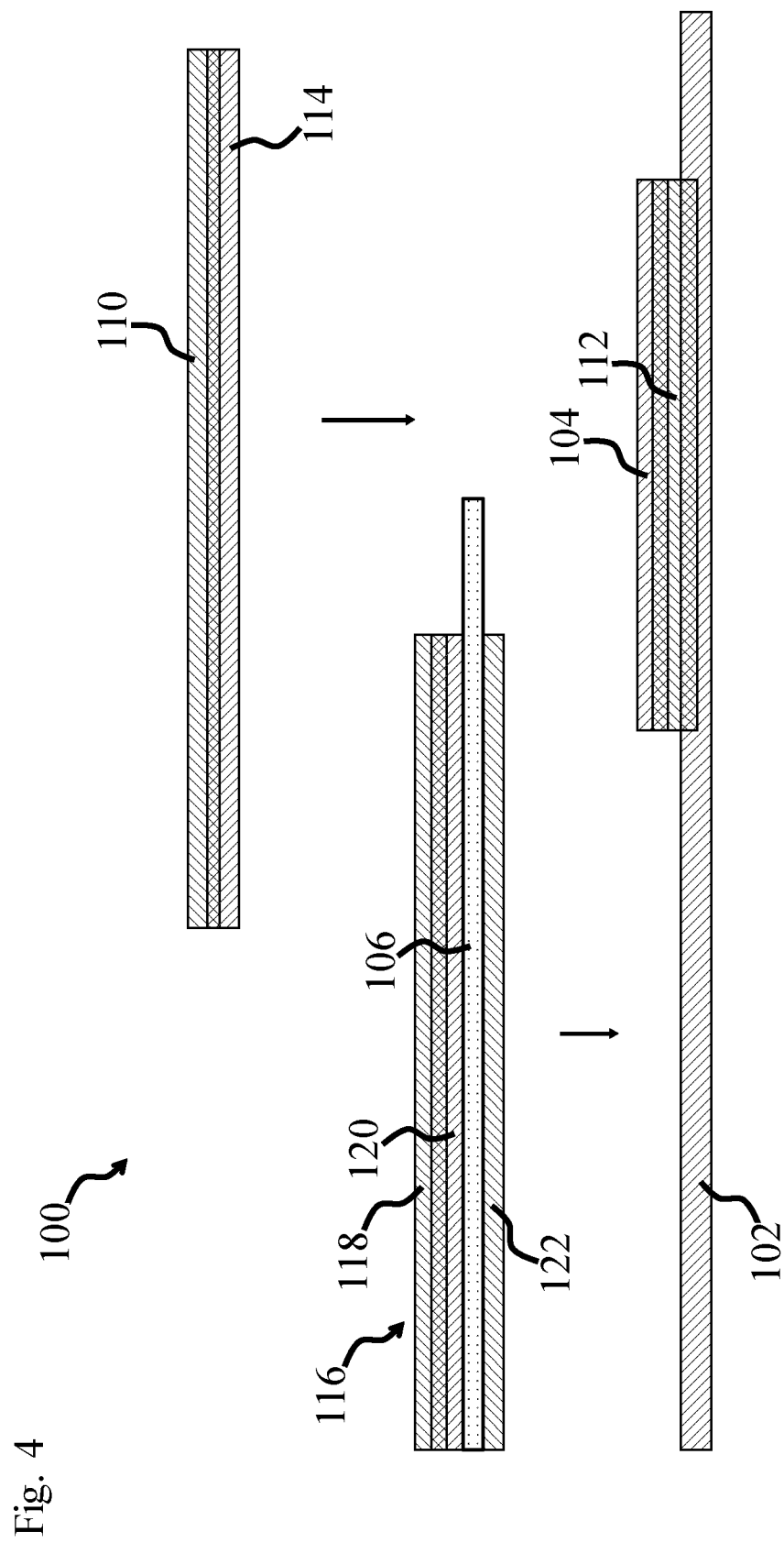
FIG. 4 shows an assembly of a connector assembly and a seam tape according to an exemplary embodiment of the invention in an exploded view.

FIG. 4 shows a further exemplary embodiment of an assembly including a seam tape 116 and a connector assembly 100 in an exploded view. In contrast to the assembly shown in FIGS. 1 to 3, the connector assembly does not comprise a second conductive fabric. The remaining components shown and denoted in FIG. 4 are identical to the components shown and denoted in FIG. 1. Thus, the connector assembly 100 comprises a base material 102 and a first conductive textile 104 located on top of and bonded to the base material 102 with a first adhesive layer 112 located between the first conductive fabric 104 and the base material 102. A portion of the electrical conductor 106 is located on top of the first conductive fabric. The cover fabric 110 is located at least on top of the first conductive fabric 104. As can be seen in FIG. 4, the cover fabric 110 may also extend over the first conductive fabric 104 such that it may also cover a portion of the seam tape 116 and/or a portion of the base material 102. A second adhesive layer 114 is located at least between the first conductive fabric 104, the electrical conductor 106 on the one side and the cover fabric 110 on the other side, such that the cover fabric 110 is bonded at least to the first conductive fabric by means of the second adhesive layer 114.

Exemplary embodiments of the method to produce a connector assembly are described with reference to FIGS. 5A to 5D and 6A to 6E.

FIGS. 5A to 5D show an assembly 100 in different stages of a method to produce a connector assembly. In the final stage shown in FIG. 5D, the assembly 100 corresponds to the assembly 100 shown in FIG. 4. The reference signs used in FIGS. 5A to 5D designate same elements as described with reference to FIG. 4.

Figure 5A:
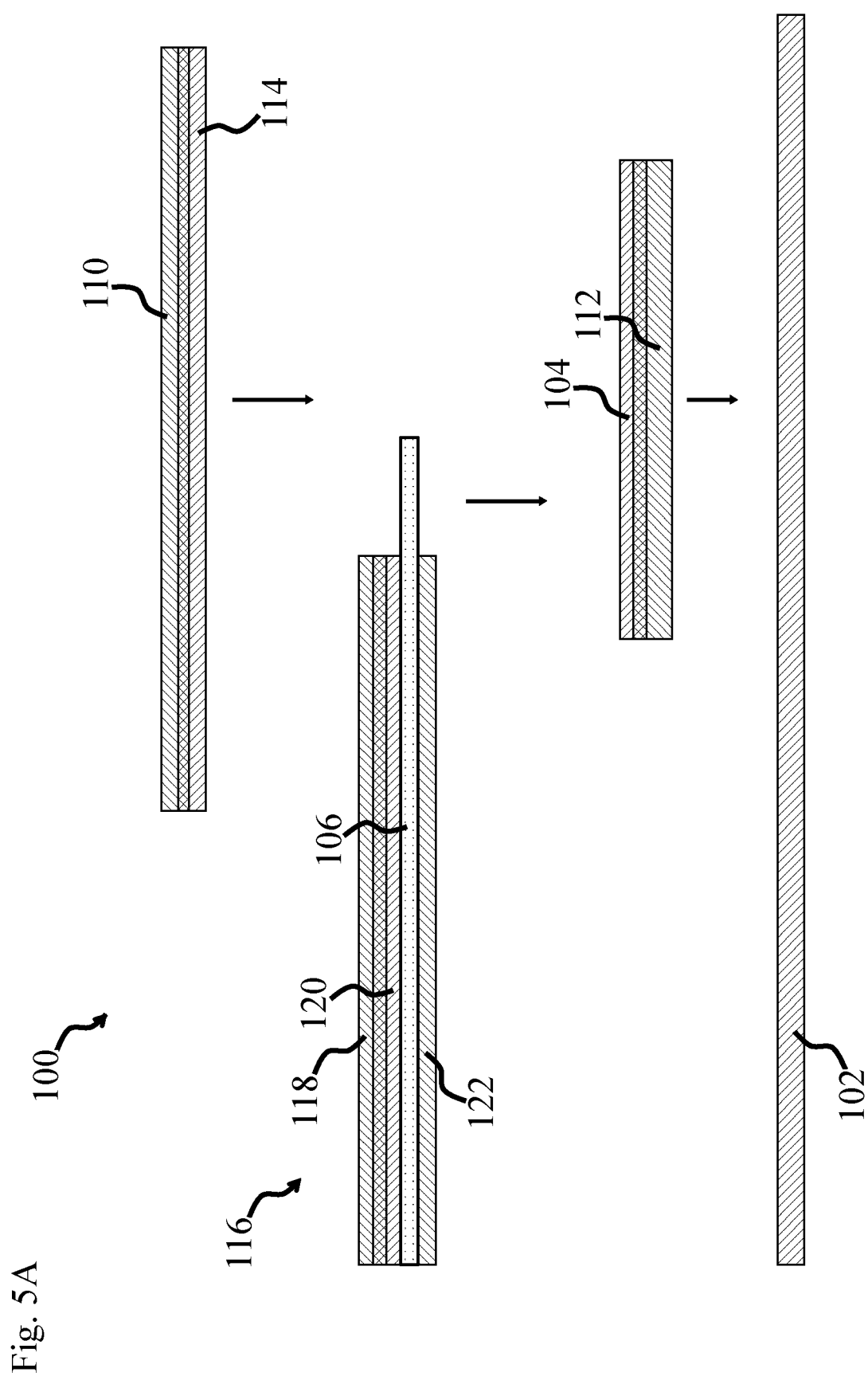
FIGS. 5A to 5D show an assembly in different stages of a method to produce a connector assembly according to an exemplary embodiment of the invention.

FIG. 5A shows a first stage of the method where a base material 102, a first conductive fabric 104, an electrical conductor 106 and a cover fabric 110 are provided. The first conductive fabric 104 comprises an adhesive layer 112, which is to be located between the first conductive fabric 104 and the base material 102. The electrical conductor 106 is at least partly embedded in a seam tape 116. The cover fabric 110 is provided with an adhesive layer 114, which is to be located between the first conductive fabric 104 and the cover fabric 110 and possibly also between the base material 102 and/or the seam tape 116 and the cover fabric 110.

Figure 5B:
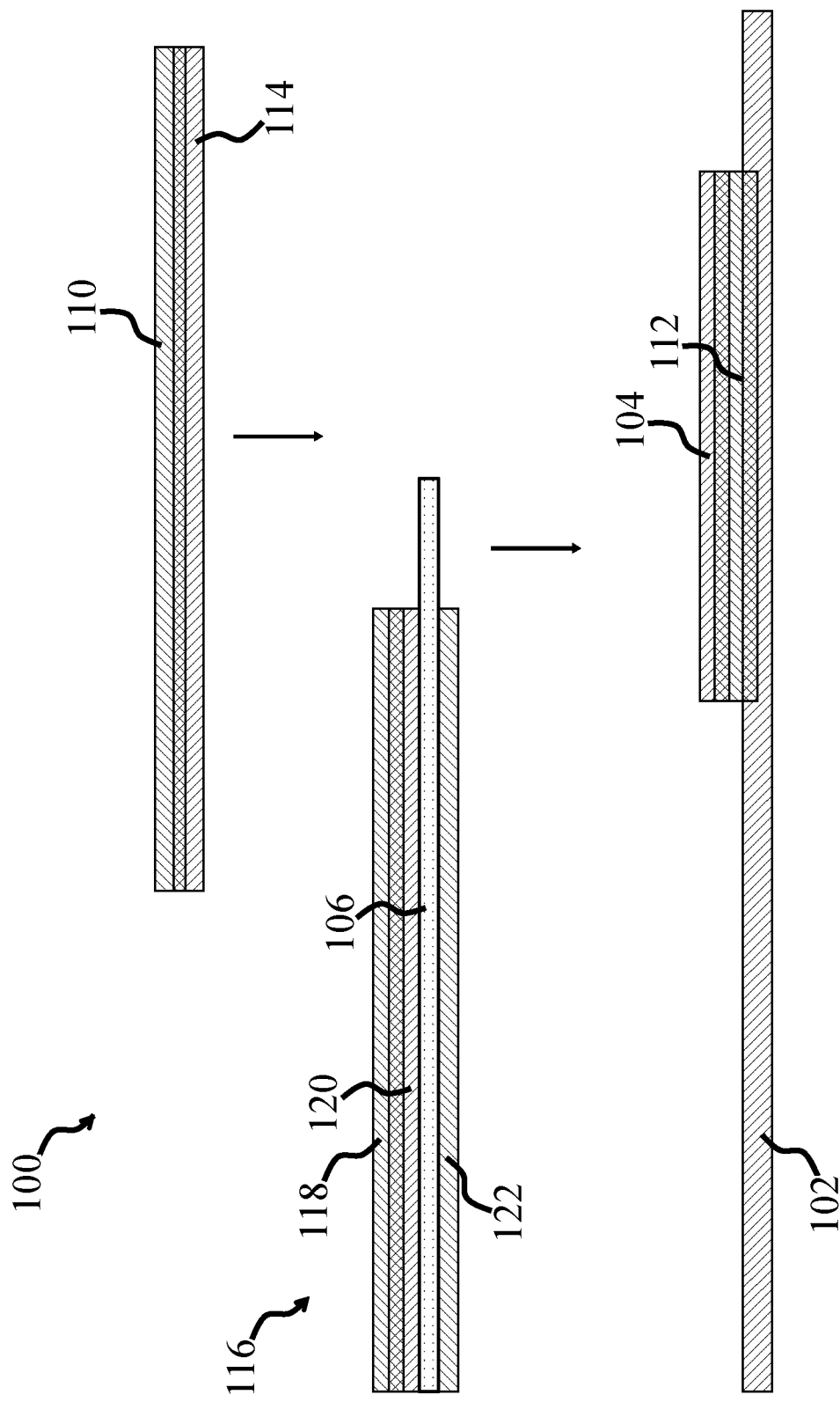

FIG. 5B shows a second stage of the method after bonding the first conductive fabric 104 to the base material 102 by means of the adhesive layer 112.

Figure 5C:
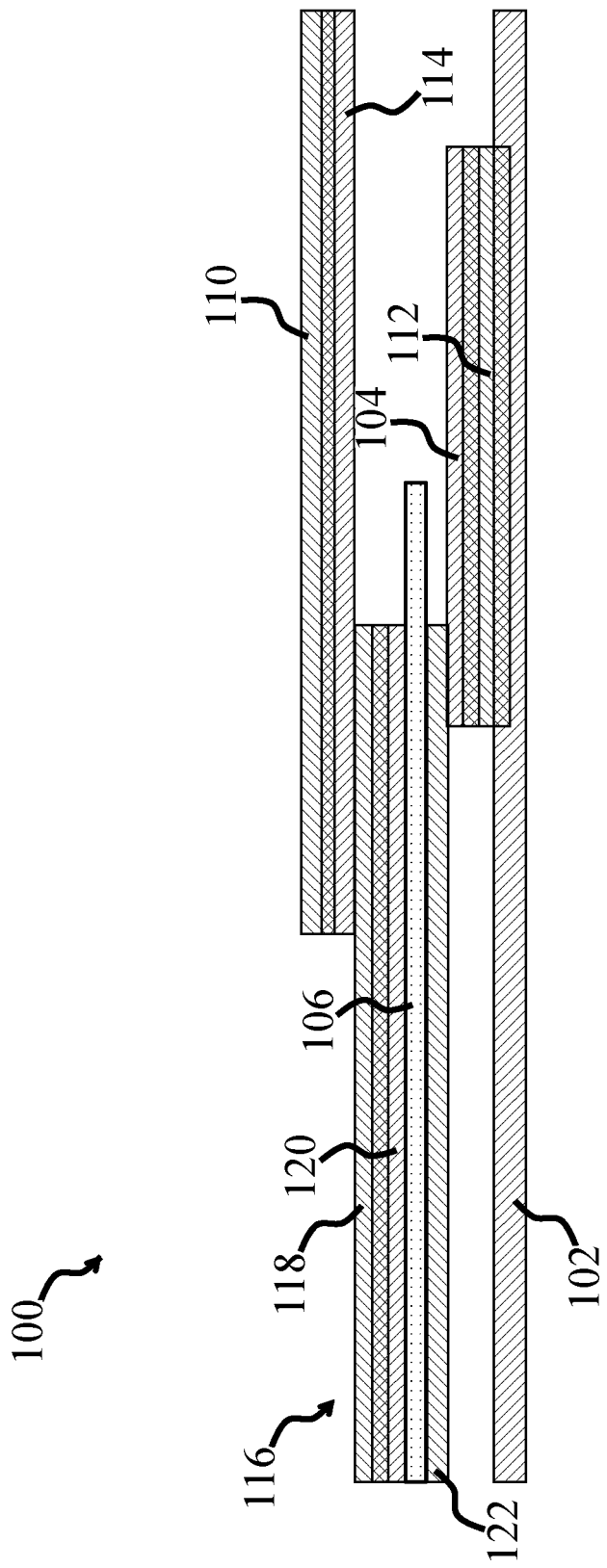

FIG. 5C shows a third stage of the method, where at least a portion of the electrical conductor 106 that is not embedded within the seam tape 116 is placed on the first conductive fabric 104. Furthermore, the cover fabric 110 is placed on said portion of the electrical conductor 106, the first conductive fabric 104, and possibly also on the base material 102 and/or the seam tape 116.

Figure 5D:
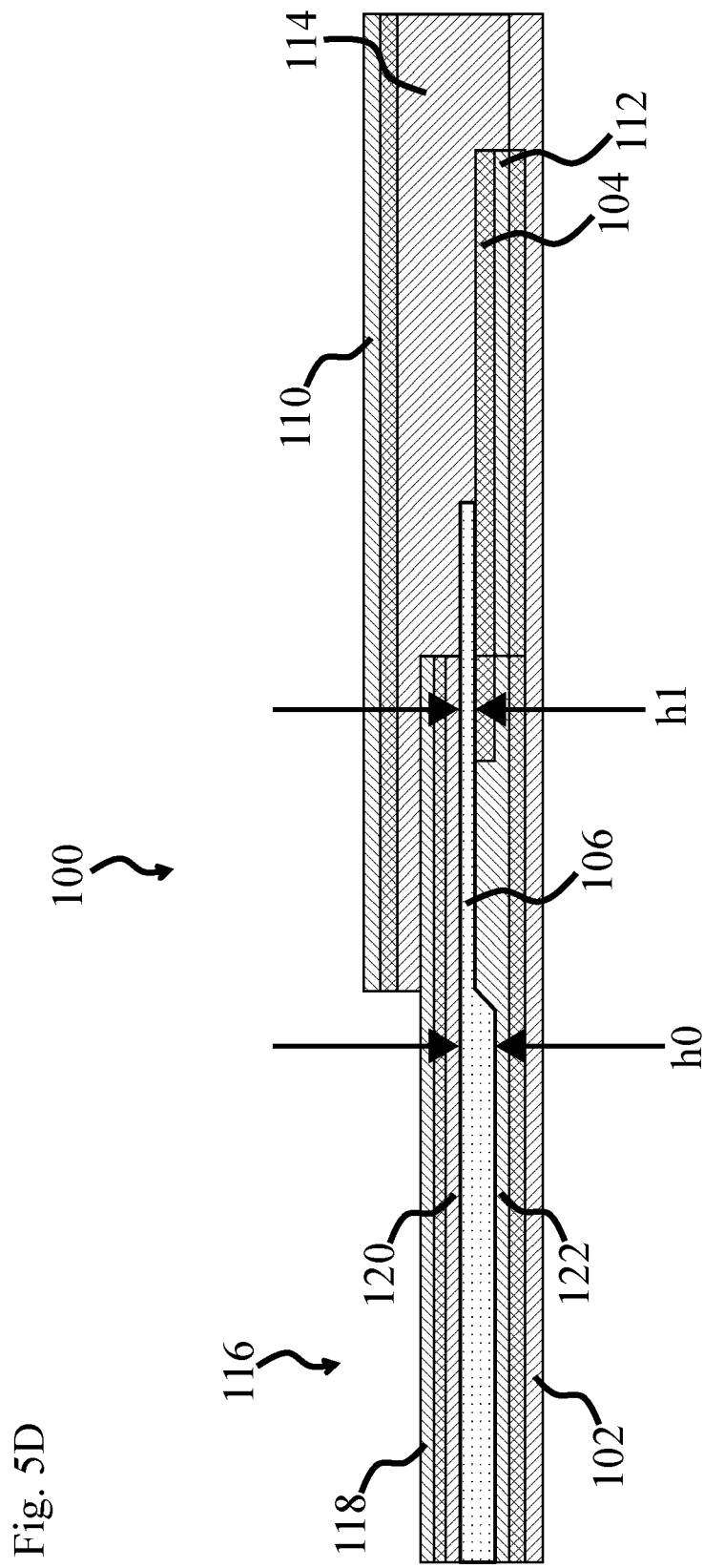

FIG. 5D shows a fourth stage of the method after bonding the cover fabric 110 to the first conductive fabric 104 and possibly also the base material 102 and/or the seam tape 116 by means of the adhesive layer 114. As can be seen, at least the portion of the conductor 106 that is sandwiched between the first conductive fabric 104 and the cover fabric 110, in this embodiment a portion of the conductor 106 sandwiched between the base material 102 and the cover fabric 110, is in a compressed stage. That is, said portion of the conductor 106 has a height h1 that is smaller than a height h0 of a portion the conductor 106 that is not located between the base material 102 and the cover fabric 110.

FIGS. 6A to 6E show an assembly 100 in different stages of a method to produce a connector assembly. In the final stage shown in FIG. 6E, the assembly 100 corresponds to the assembly 100 shown in FIG. 2. The reference signs used in FIGS. 5A to 5D designate same elements as described with reference to FIG. 4.

Figure 6A:
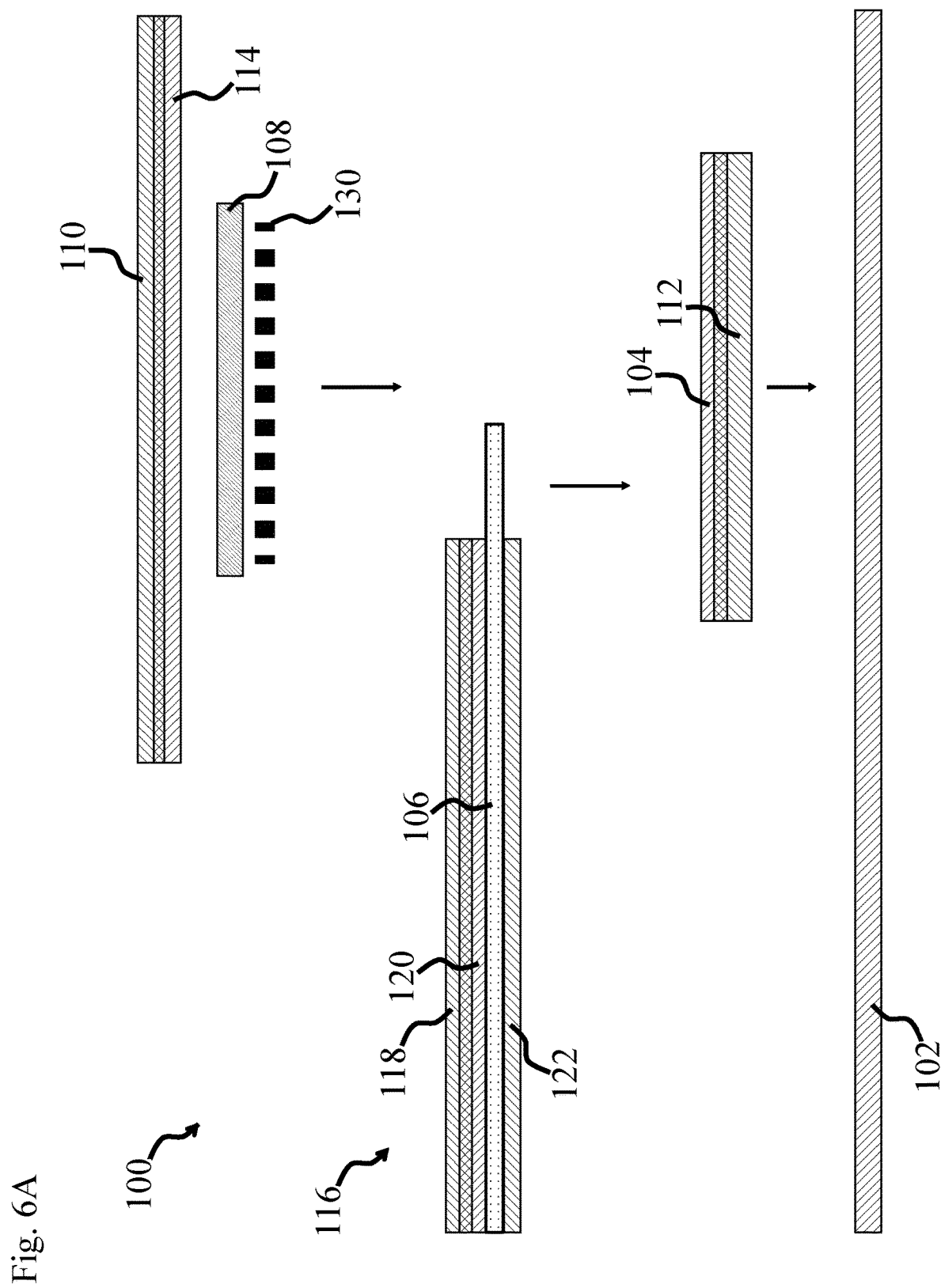
FIGS. 6A to 6E show an assembly in different stages of a method to produce a connector assembly according to an exemplary embodiment of the invention.

FIG. 6A shows a first stage of the method where a base material 102, a first conductive fabric 104, an electrical conductor 106, a perforated adhesive layer 130, a second conductive fabric 108, and a cover fabric 110 are provided. The first conductive fabric 104 comprises an adhesive layer 112, which is to be located between the first conductive fabric 104 and the base material 102. The electrical conductor 106 is at least partly embedded in a seam tape 116. The cover fabric 110 is provided with an adhesive layer 114, which is to be located between the first conductive fabric 104 and the cover fabric 110 and possibly also between the base material 102 and/or the seam tape 116 and the cover fabric 110.

Figure 6B:
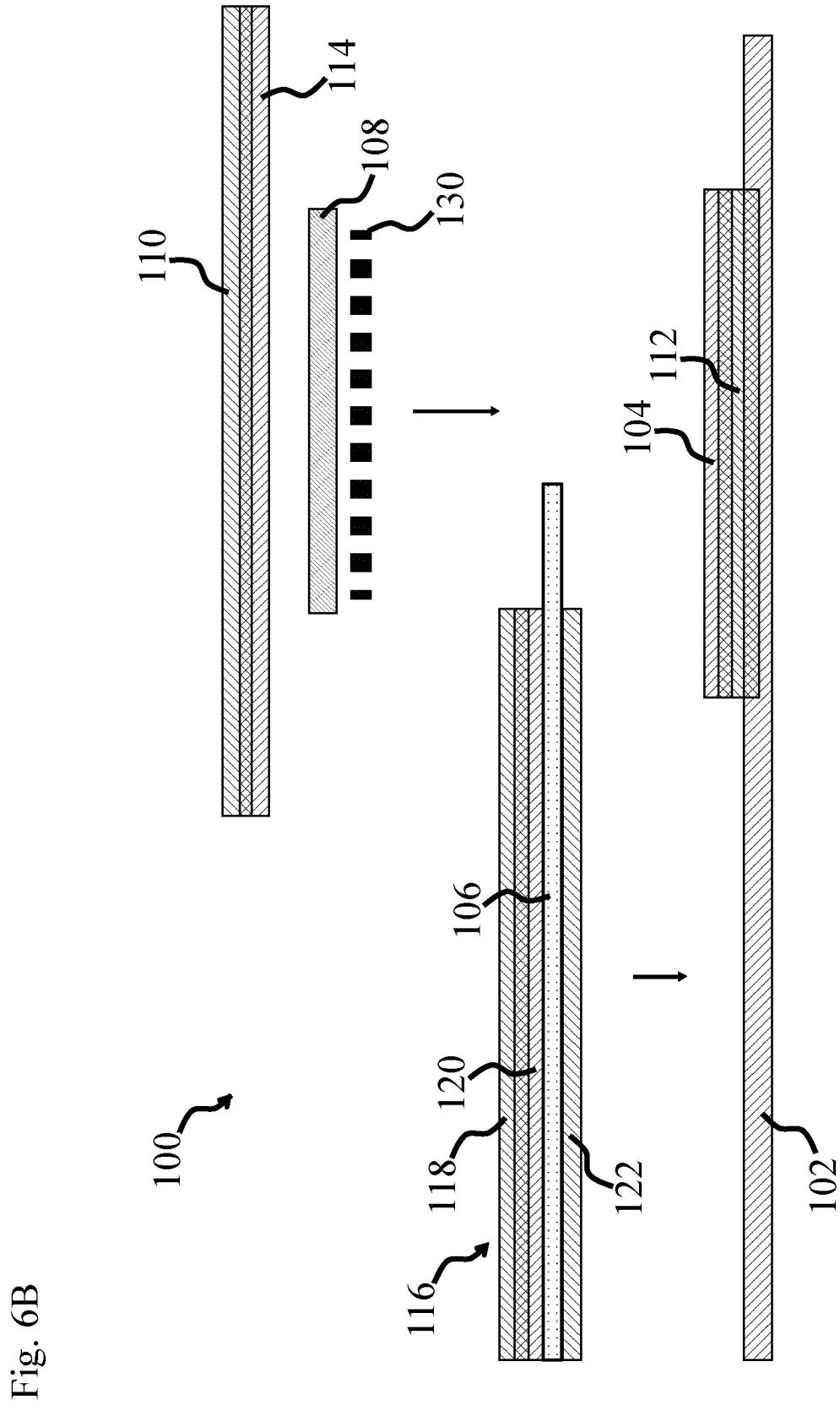

FIG. 6B shows a second stage of the method after bonding the first conductive fabric 104 to the base material 102 by means of the adhesive layer 112.

Figure 6C:
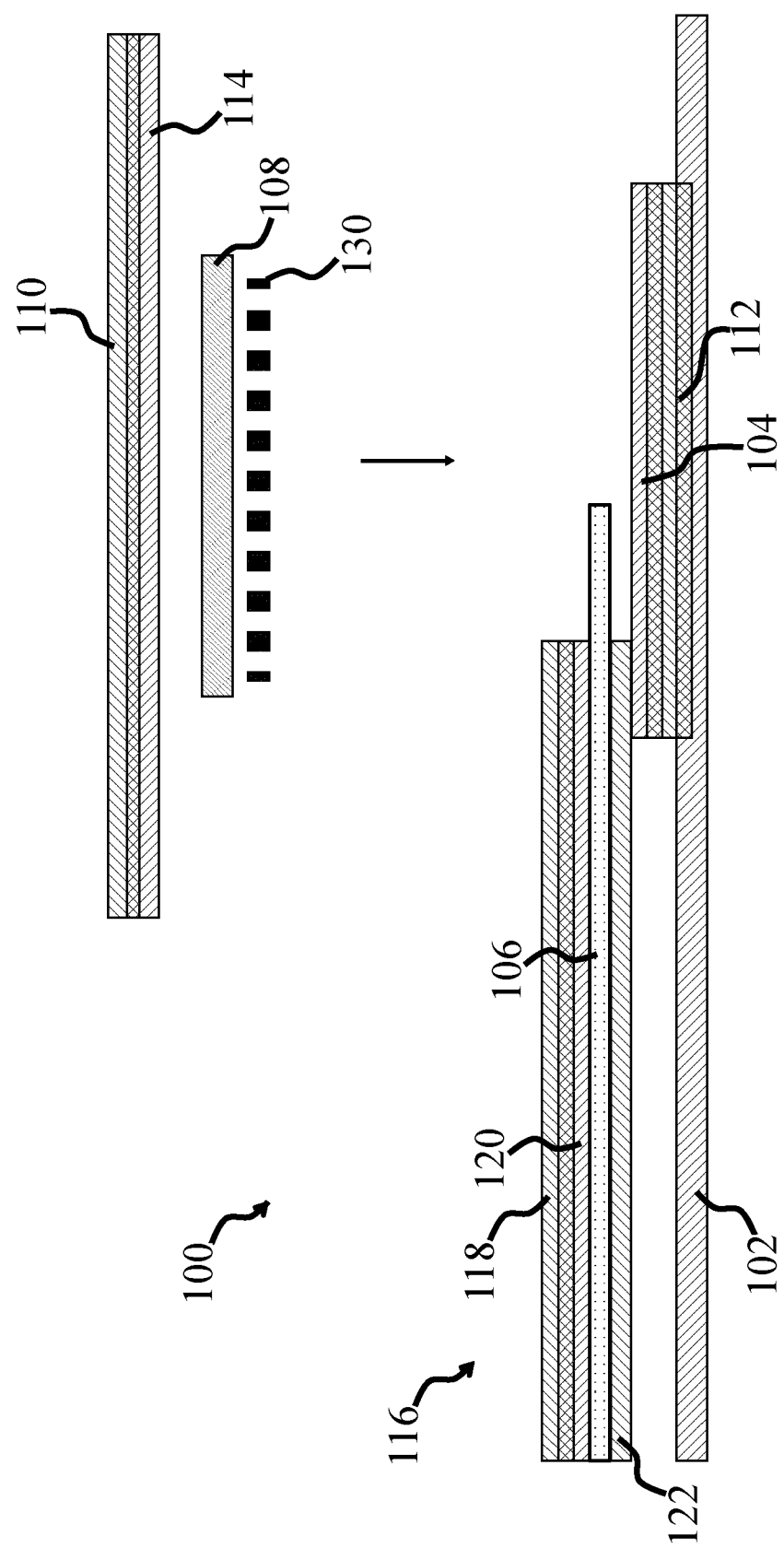

FIG. 6C shows a third stage of the method, where at least a portion of the electrical conductor 106 is placed on the first conductive fabric 104.

Figure 6D:
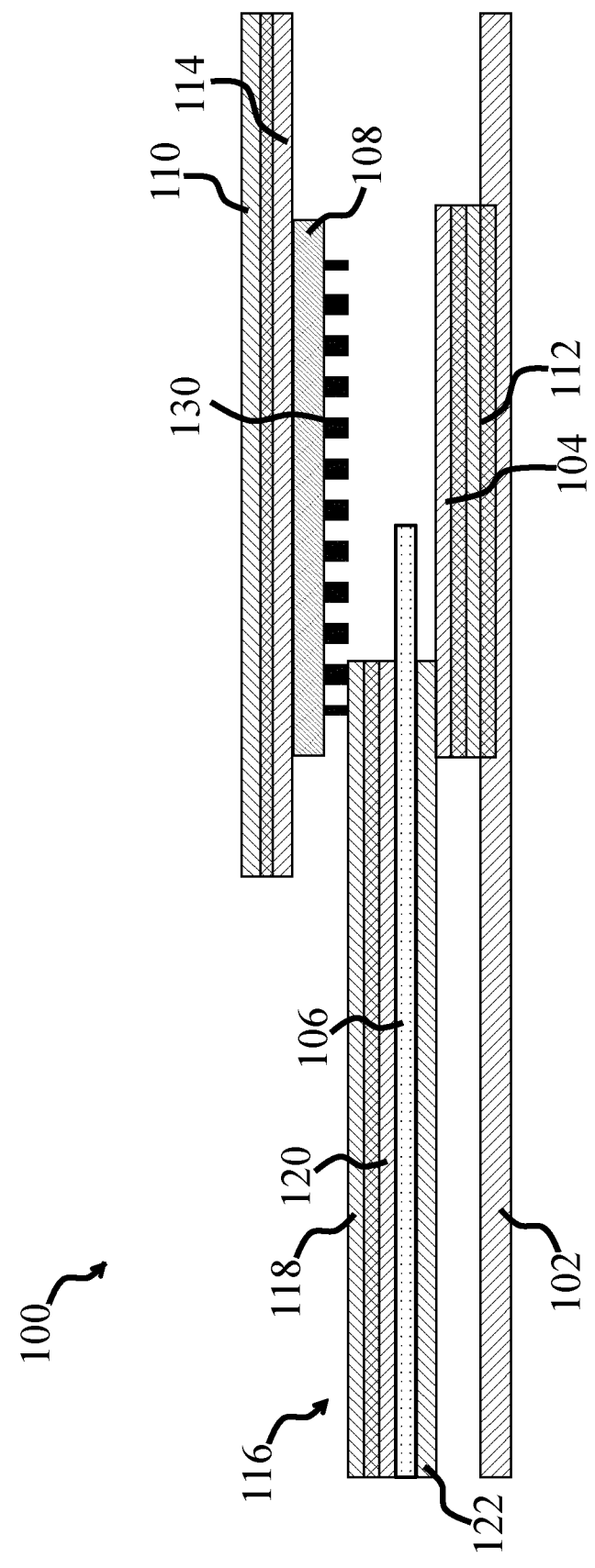

FIG. 6D shows a fourth stage of the method, where the perforated adhesive layer 130 is placed on said portion of the electrical conductor 106 and the first conductive fabric 104. Furthermore, the second conductive fabric is placed on top of the perforated adhesive layer 130 such that the said portion of the conductor 106 and the perforated adhesive layer 130 are sandwiched between the first conductive fabric 104 and the second conductive fabric 108. Moreover, the cover fabric 110 is placed on the second conductive fabric 108, and possibly also on the base material 102 and/or the seam tape 116.

Figure 6E:
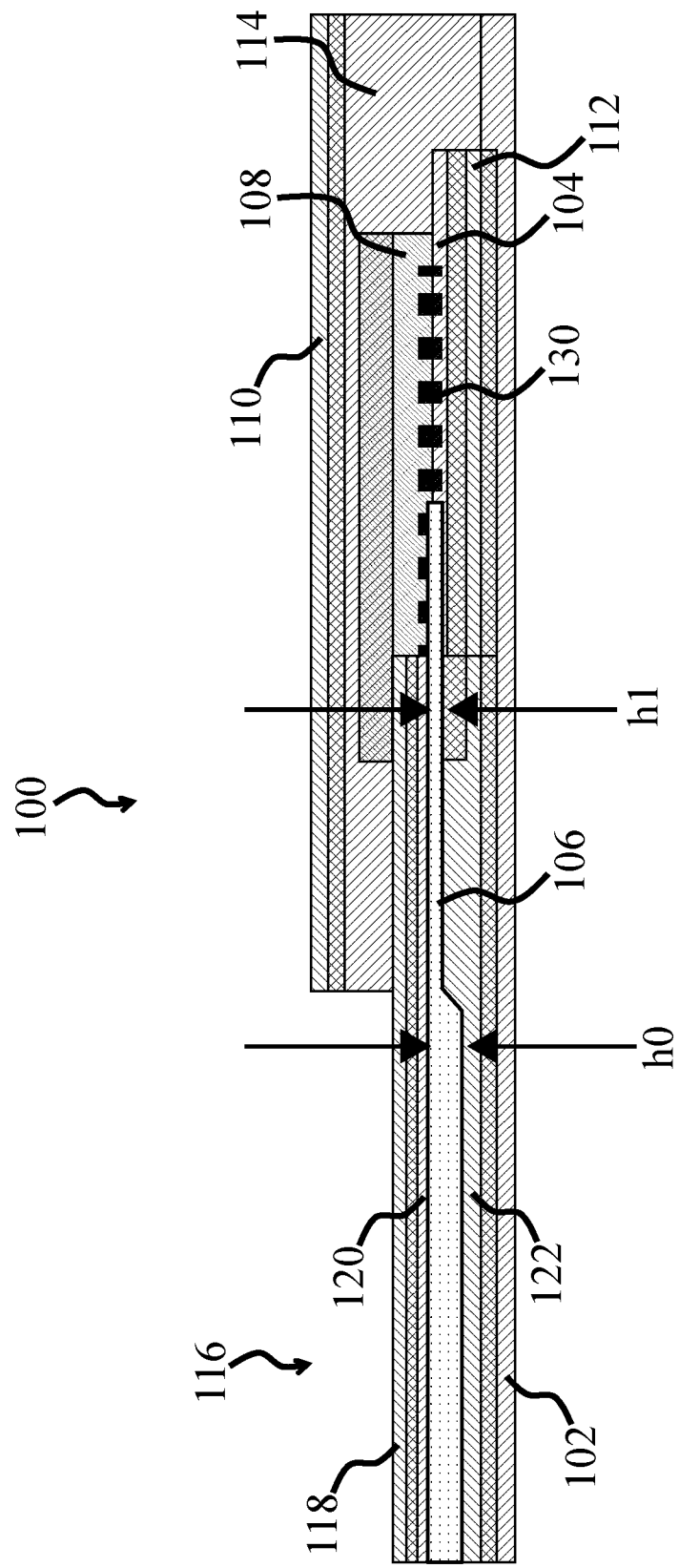

FIG. 6E shows a fifth stage of the method after bonding the second conductive fabric 108 to the first conductive fabric 104 by means of the perforated adhesive layer 130. Furthermore, the cover fabric 110 is bonded to the second conductive fabric 108 and possibly also the base material 102 and/or the seam tape 116 by means of the adhesive layer 114. As can be seen, at least the portion of the conductor 106 that is sandwiched between the first conductive fabric 104 and the second conductive fabric 108, in this embodiment a portion of the conductor 106 sandwiched between the base material 102 and the cover fabric 110, is in a compressed stage. That is, said portion of the conductor 106 has a height h1 that is smaller than a height h0 of a portion the conductor 106 that is not located between the base material 102 and the cover fabric 110.

The invention claimed is:

1. A connector assembly, comprising:
a base material;
a first conductive fabric bonded to the base material;
an elastic and compressible electrical conductor electrically connected to the first conductive fabric; and
a textile cover fabric bonded to the first conductive fabric such that a portion of the electrical conductor is located between the first conductive fabric and the textile cover fabric;
wherein a portion of the electrical conductor is at least partly in a compressed state.

2. The connector assembly according to claim 1, wherein a height of the electrical conductor in said portion of the electrical conductor measured perpendicularly to a plane defined by the first conductive fabric is smaller than 95% of the height of the electrical conductor in a relaxed state.

3. The connector assembly according to claim 1, further comprising
a second conductive fabric bonded to the cover fabric and the first conductive fabric;
wherein the portion of the electrical conductor is electrically connected to the second conductive fabric and is sandwiched between the first conductive fabric and the second conductive fabric.

4. The connector assembly according to claim 1, wherein the electrical conductor comprises an elastic and compressible core and a conductive wire wrapped around the elastic and compressible core.

5. The connector assembly according to claim 4, wherein the electrical conductor further comprises a non-conductive yarn wrapped around the elastic and compressible core.

6. The connector assembly according to claim 1, wherein the electrical conductor comprises conductive particles embedded in an elastomer matrix.

7. The connector assembly according to claim 1, wherein the connector assembly further comprises an adhesive layer located at least between the first conductive fabric and the electrical conductor
wherein the adhesive layer does not cover the full area of the first conductive layer.

8. The connector assembly according to claim 7, wherein the adhesive layer is perforated.

9. The connector assembly according to claim 1, wherein the textile cover fabric is stretchable.

10. The connector assembly according to claim 9, wherein the textile cover fabric is at least partly in a stretched state.

11. An assembly including a seam tape and the connector assembly according to claim 1,
wherein the electrical conductor is at least partly embedded in the seam tape; and
wherein the seam tape comprises a textile elastic top layer, a first adhesive layer and a second adhesive layer and the electrical conductor is at least partly sandwiched between the first adhesive layer and the second adhesive layer.

12. Method to produce the connector assembly of claim 1, the method comprising:
providing the base material;
bonding the first conductive fabric to the base material;
placing the elastic and compressible electrical conductor on the first conductive fabric; and
bonding the textile cover fabric to the first conductive fabric such that the portion of the electrical conductor is located between the first conductive fabric and the textile cover fabric;
wherein after bonding, the portion of the electrical conductor is at least partly in the compressed state.

13. The method according to claim 12,
wherein, before the bonding, the electrical conductor has a height h0 measured along a pressing direction;
wherein, after the bonding, the electrical conductor has a height h1 measured along the pressing direction; and
wherein h1<0.95*h0.

14. The method according to claim 12, further comprising the steps:
bonding a second conductive fabric to the first conductive fabric such that the portion of the electrical conductor is sandwiched between the first conductive fabric and the second conductive fabric;
bonding the textile cover fabric to the second conductive fabric such that the textile cover fabric is bonded to the first conductive fabric via the second conductive fabric.

15. The method of claim 14, further comprising the step:
placing an adhesive layer between the first conductive fabric and the second conductive fabric before bonding;
wherein the adhesive layer does not cover the full area of the first conductive layer.

16. The method of claim 14, wherein the steps of bonding first conductive fabric and the second conductive fabric is performed by hot pressing the first conductive fabric, the portion of the electrical conductor, and the second conductive fabric.

17. The method of claim 16 wherein hot pressing is performed for at least 20 s at a temperature of at least 130° C.

18. The method of claim 14, wherein no adhesive layer is placed between the first conductive fabric and the second conductive fabric before bonding.

19. The method of claim 18, wherein an adhesive layer is located between the second conductive fabric and the textile cover fabric and, in the step of bonding the second conductive fabric to the first conductive fabric, said adhesive layer located between the second conductive fabric and the cover fabric melts or extends through the second conductive fabric.

20. The method of claim 18, wherein an adhesive layer is located between the base material and the first conductive fabric and, in the step of bonding the first conductive fabric to the base material, said adhesive layer located between the base material and the first conductive fabric melts or extends through the first conductive fabric and preferably contacts the second conductive fabric.

21. The method of claim 20, wherein said adhesive layer located between the base material and the first conductive fabric and said adhesive layer contacts the second conductive fabric.

\* \* \* \* \*